United States Patent [19]

Oler et al.

[11] Patent Number: 4,980,872

[45] Date of Patent: Dec. 25, 1990

[54] TRANSDUCER POSITION CONTROL

[76] Inventors: Bob J. Oler; Jaunita E. Oler, both of 203 N. Leach, Watonga, Okla. 73772

[21] Appl. No.: 431,954

[22] Filed: Nov. 6, 1989

[51] Int. Cl.[5] .............. G01S 15/96

[52] U.S. Cl. .............. 367/173; 367/104; 73/633

[58] Field of Search .............. 367/104, 165, 173, 120; 73/620, 621, 623, 627, 629, 633

[56] References Cited

U.S. PATENT DOCUMENTS

| | | | |
|---|---|---|---|
| 2,837,727 | 6/1958 | Mayes | 367/173 |
| 4,282,590 | 8/1981 | Wingate | 367/104 |
| 4,285,485 | 8/1981 | Burke | 367/173 |
| 4,928,915 | 5/1990 | Havins | 367/173 |

*Primary Examiner*—John Chapman
*Assistant Examiner*—Rose M. Finley
*Attorney, Agent, or Firm*—Robert K. Rhea

[57] ABSTRACT

Universal directional orientation of the vibratory sensing face of a transducer is achieved by mounting the transducer on horizontal axles journaled by surrounding sleeves mounted on the depending end of a vertical standard attached to a moving carrier. The sleeves and axles are interconnected with manual controls by links and universal joints at the end portions of the standard. Manual controls are located at the upper limit of the standard for disposing the transducer in selected directions by control links extending between the manual controls and the universal joint controlled mounting of the transducer at the depending end portion of the standard.

4 Claims, 2 Drawing Sheets

TRANSDUCER POSITION CONTROL

This invention relates to fishing and more particularly to an apparatus for angularly, vertically and horizontally rotating a transducer in any desired direction.

BACKGROUND OF THE INVENTION

1. Field of the Invention

A transducer is useful in locating the position of a solitary fish or a school of fish. However, one of the problems of the use of a transducer for this purpose has been controlling the position of the transducer to search the area around the fisherman's boat in a horizontal, vertical or any angular direction in between.

This invention provides such a control for a transducer.

2. Description of the Prior Art

Most prior patents relate to the manner of safely mounting a transducer to a floating structure for protecting the transducer from encounter with any objects which might damage it.

U.S. Pat. No. 2,837,727 discloses an apparatus for mounting a hydrophone for angular rotation about a vertical axis and vertical movement of the hydrophone about a horizontal axis. This invention is distinctive over this and other prior patents by providing a manual control apparatus which in addition to permitting angular rotation of the transducer about a vertical axis and vertical movement of the transducer about a horizontal axis also permits further angular rotation of the transducer when in either position or in between through an angle of at least 60° in either direction about the longitudinal axis of an axle supporting the transducer.

SUMMARY OF THE INVENTION

An elongated tubular standard is releasably embraced intermediate its ends by clamp members for angular rotation about a normally vertical axis. The clamp members releasably connect the tubular support to a vertical support such as a boat transom.

First and second axles connected in right angular relation are rotatable in respective first and second sleeves. The first sleeve is horizontally secured to the depending end of the standard and a mounting bracket connected arm of a transducer is connected with the second sleeve. A pair of universal joints are connected respectively with the second axle and the second sleeve.

The pair of universal joints are respectively pivotally connected by a pair of control links with a pair of manual controls on the upper end portion of the standard. One of the manual controls vertically pivots the transducer about a horizontal axis through substantially 90°. The other manual control angularly rotates the transducer through approximately 30° in either direction with respect to the longitudinal axis of the second axle. Releasing the standard from the grip of the clamp member permits the standard and the transducer to be angularly rotated horizontally as a unit through 360° with respect to the longitudinal axis of the standard.

The principal object of this invention is to provide a mounting apparatus permitting 360° angular rotation of a transducer about a vertical axis and substantially 90° vertical movement of the transducer about a horizontal axis while simultaneously or individually angularly rotating the transducer with respect to a plane normal to the plane of the transducer and longitudinally bisecting the transducer.

DESCRIPTION OF THE PREFERRED EMBODIMENTS

Figure 1:
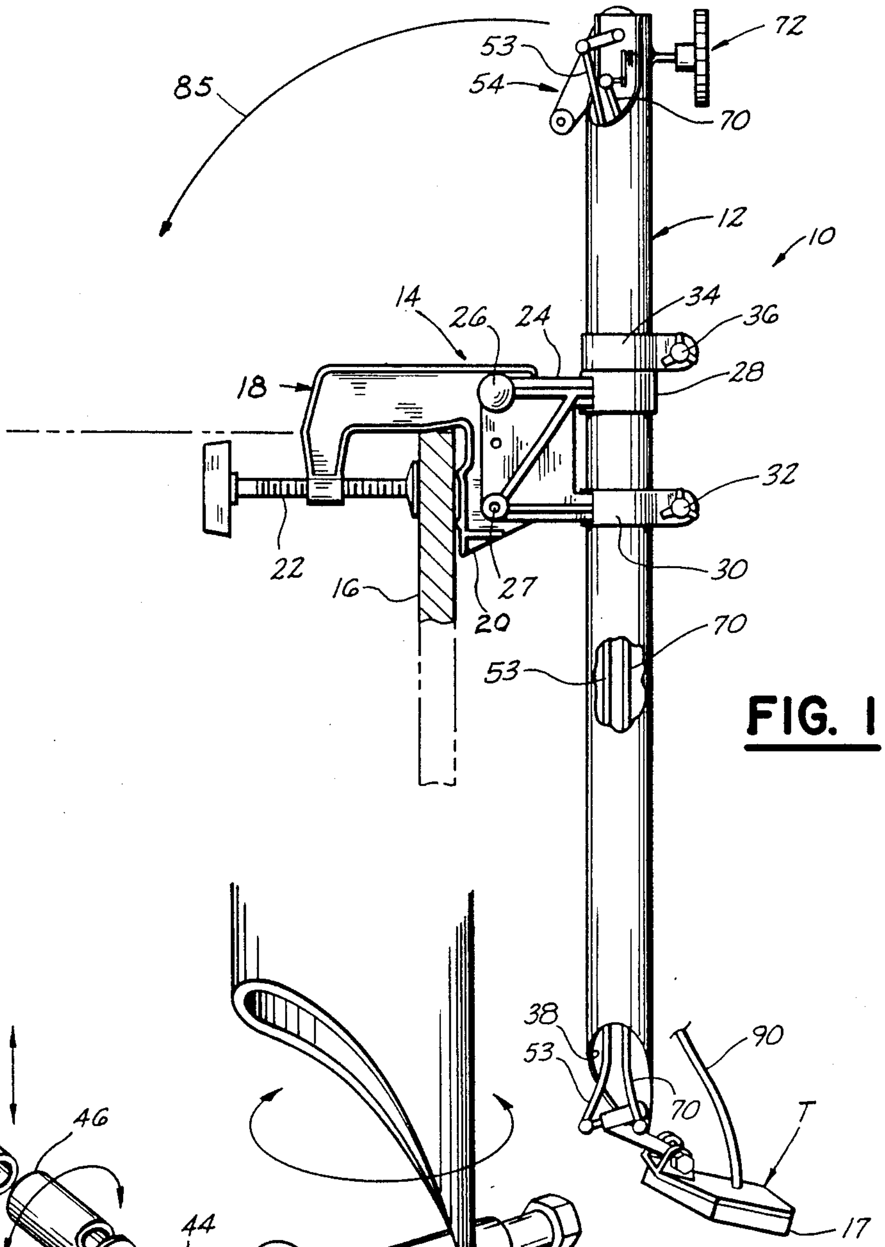
FIG. 1 is a fragmentary elevational view of the device mounted on a vertical support.
Figure 4:
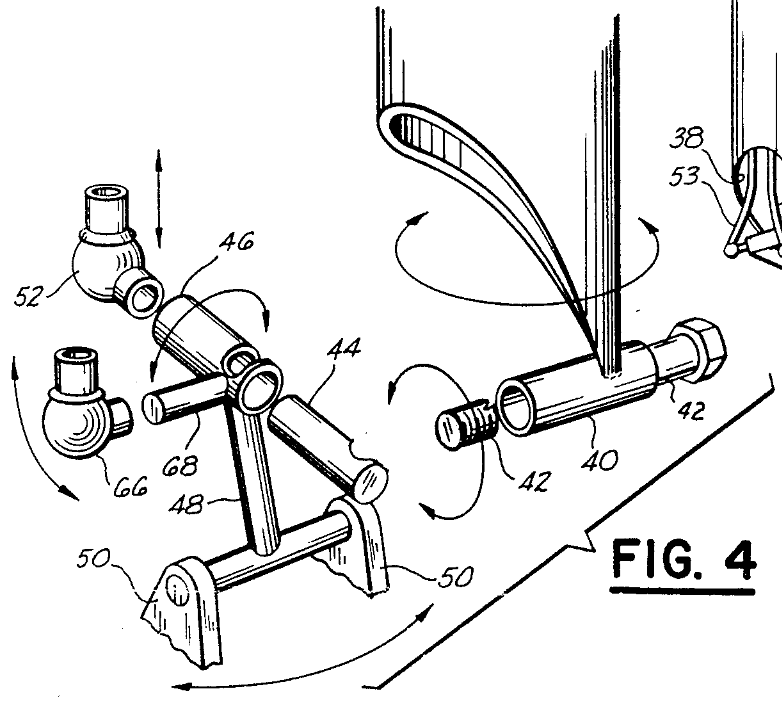
Figure 2:
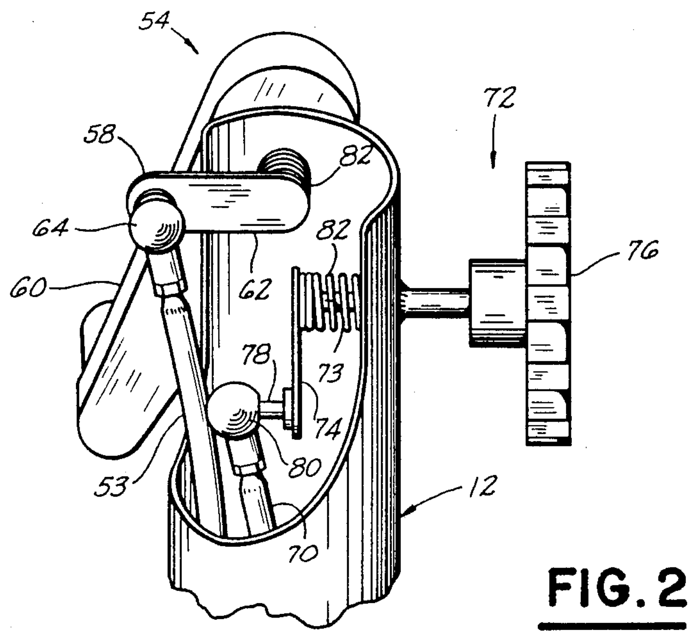
FIG. 2 is a fragmentary perspective view of the top end portion of the transducer supporting standard illustrating its manual controls.
Figure 3:
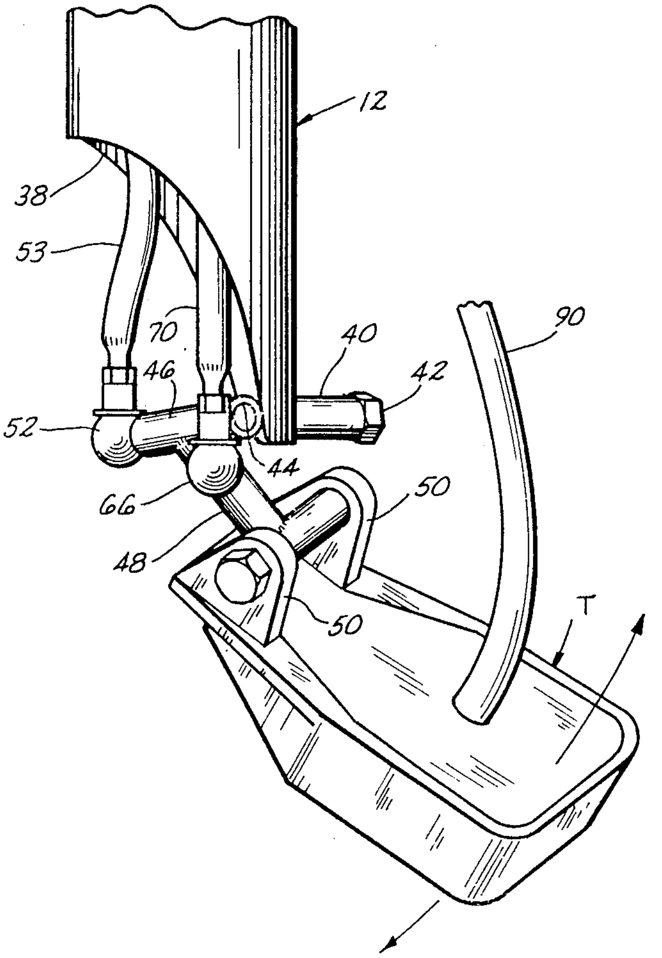
FIG. 3 is a fragmentary perspective view of the depending end portion of the standard illustrating the manner of mounting a transducer; and, FIG. 4 is a partially exploded perspective view of the axles and sleeves connecting the transducer to its mounting standard.

Like characters of reference designate like parts in those figures of the drawings in which they occur.

In the drawings:

The reference numeral 10 indicates the device as a whole comprising an elongated tubular standard 12 rotatably secured intermediate its ends by hinge means 14 for mounting on a carrier such as a boat transom 16, or the like, for normally supporting the standard vertically and controlling the orientation of the sensing flexible diaphragm or face 17 of a sonic or ultrasonic transducer T at its depending end.

The hinge means 14 includes a C-clamp 18 having its anvil jaw 20 abutting one surface of the transom 16 and its binding screw 22 gripping the opposite side of the transom. The hinge means 14 further includes a split bracket 24 straddling the C-clamp anvil jaw 20 and pivotally connected thereto by a shaft 26. A release pin 27 normally secures the standard in a vertical position.

The bracket 24 is provided with a top collar 28 freely surrounding the tubular support 12 and a lower gripping collar 30 tightened and loosened by a thumb screw 32 to grip the standard 12 and prevent its being rotated about its vertical axis. The standard 12 is gravity supported on the top collar 28 by a slip ring 34 thumb screw tightened as at 36 around the standard 12 so that the standard 12 may be manually rotated angularly as hereinafter explained.

The depending end portion of the standard is angularly bevelled as at 38 for exposing the several connected components as will now be described. A first sleeve 40 is horizontally connected at one end portion to the lower most end of the standard 12 and projects laterally beyond the cylindrical plane defined by the standard wall.

The sleeve 40 journals a stud bolt-like first axle 42 which is connected at one end in right angular relation with one end portion of a second axle 44.

The second axle 44 is surrounded by a second sleeve 46 which is rotatable relative to the axle 44. The sleeve 46 is rigidly connected with the control arm or stem 48 of the transducer T having the other end portion of the control stem rigidly connected with the mounting brackets 50 on the transducer T.

A universal action first ball joint 52 is connected with one end of the second axle 44 and the depending end of a control link 53, coextensive with the standard, in turn connected, at its upper limit, with a manual control means 54 at the top end portion of the standard 12. The top end portion of the standard 12 is similarly angularly cut away as at 56 for exposing the manual control elements as will now described.

The vertical manual control means comprises a first bell crank 58 having one leg, not shown, extended through and pivotal with respect to the wall of the standard 12 and connected with a crank handle 60 outside the wall of the standard 12. The other leg 62 of the bell crank 58 is pivotally connected, as mentioned hereinabove, with the top end of the link 53 for vertical movement of the transducer T as hereinafter explained.

Similarly, a second lower ball joint 66 is connected by a leg 68 with the sleeve 46 adjacent its connection with the control stem 48 of the transducer T. This lower ball joint 66 is similarly connected by a control link 70 with a hand wheel means 72 at the top end portion of the standard 12. The hand wheel means 72 similarly comprising a bell crank 74 having one leg 73 extending through the wall of the standard 12 and rigidly connected axially with a hand wheel 76 for pivoting movement of the bell crank 74 relative to the standard. The other leg 78 of the other bell crank 74 is similarly pivotally connected with the top end of the control shaft 70 so that angular rotation of the control wheel 76 tilts the transducer T about the longitudinal axis of the axle 44 as hereinafter explained.

Each of the manual controls, the crank handle 60 and the hand wheel 76, have their respective bell crank arms urged away from the inner wall surface of the standard 12 by a pair of springs 82 to retain the control components in the position desired after being manually moved and released as hereinafter explained.

OPERATION

In operation the device 10 is mounted on a vertical panel of a moving carrier with the standard 12 normally vertically disposed. The transducer is operatively connected to a suitable amplifier, loud speaker, ear phones or, preferably, a LCR (liquid crystal readout) none being shown, which displays the sensed objects on a screen or graph, neither being shown, located on the carrier by a fluid-tight cable 90. The handle member 60 is angularly rotated about its mounting axis for moving its bell crank arm 62 vertically about its horizontal arm mounting on the standard which raises and lowers the control link 53, vertically pivoting the sleeve 46 and axle 44 about the horizontal axis of the first axle 42. This vertically pivots the transducer T about the horizontal axis of the first axle 42. Angular rotation of the crank handle 60 may thus move the transducer sensing face 17 through an angle of substantially 90°.

Simultaneous with this action or individually of this movement, the control wheel 76 may be angularly rotated about the axis of its crank arm 73. Vertical movement in respective directions of its crank arm 74 about the axis of its leg 73 raises and lowers the control link 70 and the ball joint 66 thus tilting the transducer T through an angle of approximately 30° on either side of a vertical plane longitudinally bisecting and normal to the planar signal receiving base 17 of the transducer T. Simultaneously with either of these movements of the control means 54 and 72, the clamp support 30 may be loosened and the standard 12 manually rotated angularly about its vertical axis so that the transducer T may have its detecting face surface 17 oriented in any desired direction from 360° in a horizontal plane to a substantially vertical plane in alignment with the vertical axis of the standard 12 or turned laterally in either direction by rotational movement of the transducer about the longitudinal axis of the second axle 44. By pulling the pin 27, the standard may be pivoted, in the direction of the arrow 85, about the axis of the shaft 26 to a horizontal position.

Obviously the invention is susceptible to changes or alterations without defeating its practicability. Therefore, we do not wish to be confined to the preferred embodiment shown in the drawings and described herein.

We claim:

1. A transducer support and position control, comprising:

a normally upright standard;

clamp means surrounding an intermediate portion of said standard in supporting relation for securing the latter to a carrier;

a transducer having a mounting arm;

right angularly disposed axle-and-sleeve means horizontally interposed between and connecting the transducer arm with the depending end of said standard for vertical pivoting movement of said transducer about the horizontal axis of one axle of said axle-and-sleeve means and for lateral rocking movement of said transducer about the longitudinal axis of another axle of said axle-and-sleeve means;

a pair of manual control means secured to the top end portion of said standard;

a pair of links coextensive with said standard and respectively connected with said manual control means; and, a pair of universal joints respectively connecting one link of said pair of links with one axle of said axle-and-sleeve means and connecting the other link of said pair of links with said transducer arm.

2. The transducer support according to claim 1 in which said axle-and-sleeve means includes:

a first sleeve horizontally secured to the depending end of said standard;

a first axle journalled by said first sleeve;

a second axle rigidly secured at one end portion with one end of said first axle; and, a second sleeve journalled by said second axle and connected with said transducer arm.

3. The transducer support according to claim 2 in which said clamp means rigidly supports said standard when in one position and loosely supports said standard when in another position for permitting manual angular rotation of said standard about its longitudinal axis.

4. A transducer support and position control, comprising:

an elongated standard;

means normally supporting said standard vertically;

a transducer having a mounting arm and having a vibration sensing face;

axle-and-sleeve means connecting said transducer arm with the depending end of said standard in a manner permitting universal movement of said transducer for disposing its vibration sensing face in any desired direction; and, manually operated control means mounted on said standard and connected with said axle-and-sleeve means for disposing the vibratory sensing face of said transducer in any desired direction.

* * * * *